United States Patent [19]

Bainard

[11] 3,941,393
[45] Mar. 2, 1976

[54] SEAL METHOD AND ARTICLE
[75] Inventor: Dean R. Bainard, Bethel Township, S.C.
[73] Assignee: Garlock Inc., Palmyra, N.Y.
[22] Filed: Mar. 15, 1974
[21] Appl. No.: 451,447

[52] U.S. Cl. ................................ 277/9.5; 277/153
[51] Int. Cl.² ......................................... F16J 15/32
[58] Field of Search ............... 277/9.5, 9, 153, 164; 161/234

[56] References Cited
UNITED STATES PATENTS
2,728,735  12/1951  Anderson ..................... 161/234 UX
2,932,535  4/1960  Peickii ............................. 277/153

Primary Examiner—Robert I. Smith
Attorney, Agent, or Firm—Schovee & Boston

[57] ABSTRACT

The spring installed on the sealing element of a seal is positively retained during shipping, handling and installation by covering the spring and at least adjacent portions of the sealing element with a film of wax. In the preferred embodiment of a lip type seal including a metal casing and an elastomeric sealing element having a garter spring installed thereon, the entire head section and spring of the seal are covered with a film of wax by immersing the head section in a melted wax-like substance. The wax film positively retains the spring and also provides lubrication to the sealing lip during initial installation and start up.

9 Claims, 2 Drawing Figures

SEAL METHOD AND ARTICLE

BACKGROUND OF THE INVENTION

1. Field of the Invention

This invention relates to seals of the type employing a spring installed on a sealing element and more particularly to a method and article for positively retaining the spring in place during shipping, handling and installation of the seal.

2. Description of the Prior Art

The problem of positively retaining a spring in place on a seal is an old and recurring problem in the oil seal industry both among suppliers and users. Many solutions have been attempted, however, none have to date been completely commercially satisfactory. For example, U.S. Pat. No. 2,816,784, assigned to the same assignee as is the subject patent application, shows a seal including a resilient tube in which the garter spring is positioned, the tube being adhesively fixed into a groove in the sealing flange of the seal.

It is an object of the present invention to provide a simple and inexpensive method (and seal produced thereby) wherein the spring of the seal is positively retained during shipping, handling and installation.

It is another object of the present invention to provide a method (and a seal produced thereby) for positively retaining the spring by covering the spring and adjacent portions of the seal element with a film of wax; in the preferred embodiment the entire head section and spring is immersed in melted wax to positively retain the spring in place while also providing lubrication to the sealing lip during the initial installation and start-up.

SUMMARY OF THE INVENTION

In the preferred embodiment, the entire head section and spring of an annular lip type seal including a metal case and an elastomeric sealing element with a garter spring installed in a groove behind the sealing lip, is immersed in a melted wax-like substance, and is then withdrawn allowing the melted wax to cool and harden covering the entire head section and spring of the seal with a unitary and integral wax film to positively retain the spring during shipping, handling and installation and to provide lubrication to the sealing lip during initial installation and start-up. In the immersion step, the seal is brought down such that the metal case of the seal is in contact with an upper edge of a vessel containing the melted wax and associated with means for heating the wax to a temperature sufficient to melt it. The top surface of the melted wax is maintained at such a level with respect to the top edge of the vessel and with respect to the shape of the metal case, such that the entire head section and spring of the seal is immersed within the melted wax. A variety of known waxes can be used and the method can be applied to other types of seals.

BRIEF DESCRIPTION OF THE DRAWINGS

The present invention will be more fully understood by reference to the following detailed description thereof, when read in conjunction with the attached drawing, wherein like reference numerals refer to like elements and wherein.

DETAILED DESCRIPTION OF THE PREFERRED EMBODIMENT

Figure 1:
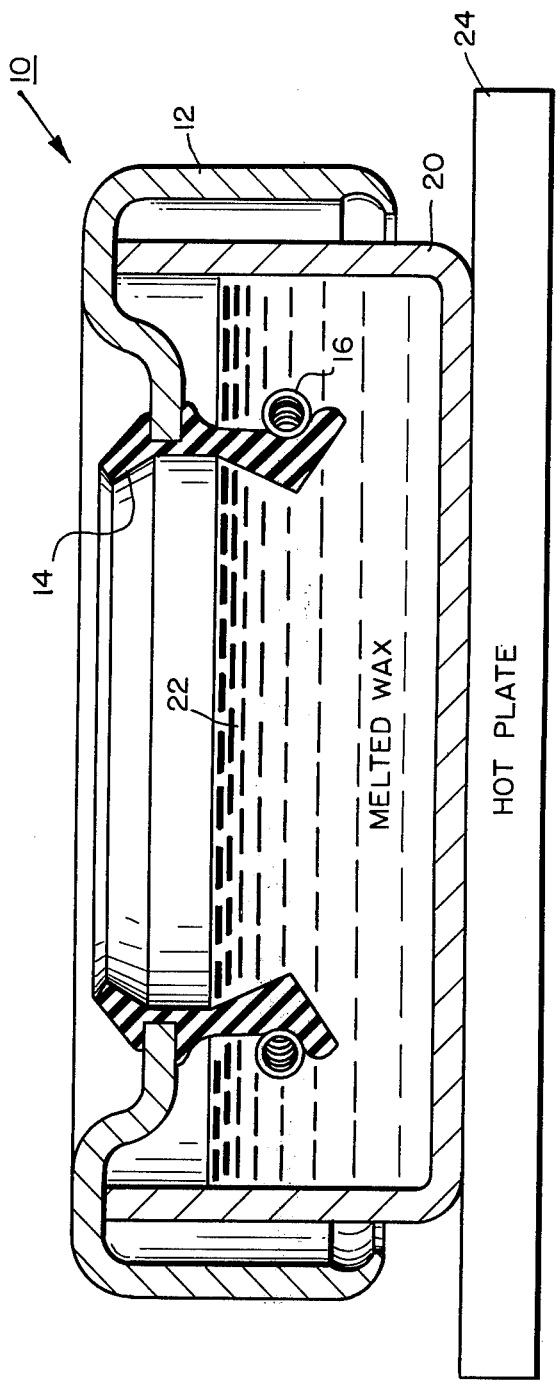
FIG. 1 is a cross-sectional view through a seal being immersed in a quantity of melted wax according to the method of the present invention.

Referring now in detail to the drawings, FIG. 1 shows a well-known lip type seal 10 including a metal case 12, an elastomeric sealing element 14 bonded thereto and having a garter spring 16 installed in a groove thereon opposite a sealing lip thereof. According to the process of the present invention, the spring 16 and the entire head section 26 of the elastomeric sealing element 14 of the seal 10 is covered with a unitary and integral film 18 of a wax-like substance, by immersing the spring 16 and the head section 26 in a quantity of melted wax inside a vessel 20 (such as a metal cup). A hot plate 24 beneath the vessel 20 heats the wax to a temperature sufficient to melt it. The level of the top surface of the melted wax 22 is maintained, with respect to the top edge of the vessel 20 and the shape of the seal 10, such that the melted wax is above the entire head section 26 and spring 16 of the seal 10.

Figure 2:
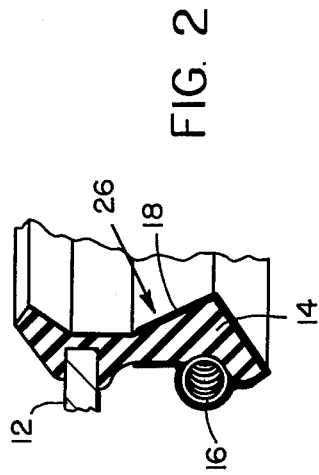
FIG. 2 is a partial cross-section view through the seal of FIG. 1 showing the film of wax completely around the head section and spring of the seal.

FIG. 2 shows the seal 10 removed from the vessel 20 and the melted wax allowed to cool and harden to form the wax film 18 over the head section 26 and the spring 16. The film 18 is a single unitary layer that is applied simultaneously to both the spring and head section, and the portion of the layer over the spring is thus integral with the portion over the head section 26.

The wax used in the present invention can be any of the known waxes used, for example, in the prior art to provide lubrication to a sealing lip during initial installation and start-up, such as animal, vegetable and mineral waxes. When sealing petroleum products, a preferred wax is paraffin. The wax film 18 preferably has a thickness in the order of from about 0.0005 to 0.0050 inch, although it may be substantially thicker. It is very desirable that a wax be used which will blend readily with the fluid to be sealed when the seal is put into use.

It is not essential to this invention that the wax film 18 cover the entire head section, because such is not necessary in order to assure positive retention of the spring. It is only necessary that at least a part of the spring be covered along with a sufficient amount of the adjacent flexible sealing element to hold the spring in place. Covering the entire head section is preferred because it is easy and because it can provide initial lubrication during start-up. Conversely, it is not essential to this invention that the wax film be limited to covering part or all of the head section. Under some conditions it is preferable to cover the entire seal. This can allow reduced production costs and can help to maintain a static seal between the seal as installed and an associated machine housing. This invention is useful with any sealing element-spring combination; the seal need not have a metal case or an elastomeric sealing element, and the spring need not be a garter type spring.

The invention has been described in detail with particular reference to the preferred embodiments thereof, but it will be understood that variations and modifications can be effected within the spirit and scope of the invention as described hereinabove and as defined in the appended claims.

I claim:

1. A seal having a flexible sealing element and a spring installed thereon, and a unitary and integral film of wax covering a sufficient portion of both said spring and said sealing element for retaining said spring on said sealing element during shipping, handling, and installation of said seal.

2. The seal according to claim 1 wherein said sealing element includes a head portion having a sealing lip and wherein said spring is in contact with said head portion and wherein said film of wax covers said spring and said head section including said sealing lip, whereby said wax film also provides lubrication to said sealing lip during initial start-up.

3. The seal according to claim 2 wherein said seal is a lip type seal including a metal case and an elastomeric sealing member bonded thereto, and wherein said spring is a garter spring installed on said elastomeric member.

4. The seal according to claim 3 wherein said wax is paraffin.

5. The seal according to claim 4 wherein said wax film has a thickness of from about 0.0005 to 0.0050 inch.

6. The seal according to claim 1 wherein said wax film has a thickness of from about 0.0005 to 0.0050 inch.

7. The seal according to claim 1 wherein said film of wax covers said entire seal.

8. A seal having a flexible sealing element, a spring installed thereon, and means for retaining said spring in place on said flexible sealing element during shipping, handling and installation of said seal, said means including a coating of wax over at least a portion of said spring and adjacent portions of said sealing element.

9. The article according to claim 8 wherein said coating is a unitary and integral coating of paraffin wax.

* * * * *